US009225208B2

(12) United States Patent
Downing et al.

(10) Patent No.: US 9,225,208 B2
(45) Date of Patent: Dec. 29, 2015

(54) INTERNAL COOLING OF MAGNETIC CORE FOR ELECTRIC MACHINE

(75) Inventors: Robert Scott Downing, Rockford, IL (US); Roger John Collings, Rockford, IL (US); Mark F. Franzen, Brodhead, WI (US); Hebri Vijayendra Nayak, Rockford, IL (US); Kris H. Campbell, Poplar Grove, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 220 days.

(21) Appl. No.: 13/250,185

(22) Filed: Sep. 30, 2011

(65) Prior Publication Data

US 2013/0113311 A1 May 9, 2013

(51) Int. Cl.
*H02K 1/20* (2006.01)
*H02K 1/32* (2006.01)
*H02K 9/19* (2006.01)

(52) U.S. Cl.
CPC .. *H02K 1/20* (2013.01); *H02K 1/32* (2013.01); *H02K 9/19* (2013.01)

(58) Field of Classification Search
CPC ............. H02K 9/16; H02K 1/20; H02K 9/19; H02K 1/32
USPC ........................... 310/52, 54, 58, 59, 60 A, 61
IPC ........................................ H02K 9/08, 9/16, 9/19
See application file for complete search history.

(56) References Cited

U.S. PATENT DOCUMENTS

| 890,577 | A | * | 6/1908 | Richards | 310/65 |
| 5,866,959 | A | * | 2/1999 | Le Flem | 310/51 |
| 6,504,274 | B2 | * | 1/2003 | Bunker et al. | 310/64 |
| 6,762,520 | B1 | * | 7/2004 | Ehrhart et al. | 310/86 |
| 6,954,010 | B2 | * | 10/2005 | Rippel et al. | 310/60 A |
| 2010/0102649 | A1 | * | 4/2010 | Cherney et al. | 310/54 |

FOREIGN PATENT DOCUMENTS

| DE | 3334501 A1 | * | 3/1984 | | |
| EP | 155405 A1 | * | 9/1985 | ............. | H02K 1/20 |
| JP | 63144734 A | * | 6/1988 | ............. | H02K 3/24 |
| JP | 2003153495 A | * | 5/2003 | ............. | H02K 9/19 |
| JP | 2008312292 A | * | 12/2008 | | |

OTHER PUBLICATIONS

Machine Translation, JP 2008312292 A, Dec. 25, 2008.*
Machine Translation, Akatsu et al., JP 2003153495 A, May 23, 2003.*
Machine Translation, Besselmann, EP 155405 A1, Sep. 25, 1985.*
Machine Translation, Tuji, DE 3334501 A1, Mar. 29, 1984.*

* cited by examiner

*Primary Examiner* — Thomas Truong
(74) *Attorney, Agent, or Firm* — Cantor Colburn LLP

(57) ABSTRACT

A core for an electric machine includes a core component having a plurality of core teeth defining a plurality of core slots between adjacent core teeth of the plurality of core teeth. The plurality of core slots are receptive of one or more windings. A coolant flowpath through the core component is formed through at least one core tooth. The at least one core tooth has one or more coolant tube banks and one or more mixing chambers arranged in an alternating pattern along the at least one core tooth.

14 Claims, 3 Drawing Sheets

INTERNAL COOLING OF MAGNETIC CORE FOR ELECTRIC MACHINE

FEDERAL RESEARCH STATEMENT

This invention was made with Government support under FA8650-06-D-2621-0002 awarded by the United States Air Force. The Government has certain rights in this invention.

BACKGROUND OF THE INVENTION

The subject matter disclosed herein relates to electrical machines. More specifically, the subject matter disclosed herein relates to liquid cooling of magnetic cores of electric machines.

A typical liquid cooled electric machine includes a rotor having a core and one or more rotor windings (conductors) extending therethrough. In some machines, permanent magnet machines, the rotor windings are replaced with a plurality of permanent magnets. The rotor is surrounded by a stator and an air gap exists between the rotor and stator. Similarly, the stator includes a stator core having one or more stator windings extending therethrough. High power density electric machines (either generator or motor) produce intense resistive heating of both the stator and rotor windings and eddy current and magnetic hysteresis heating of the rotor and stator cores. Typical methods of stator cooling include utilizing an end-turn spray and thermal conduction through the back iron to a cooled housing or fluid media. The end turn spray is most often from orifices in the rotor, but it can be supplemented with fixed spray nozzles on the housing. The spray is directed at end turns of the stator windings to cool by impingement. Back iron cooling includes directing cooling liquid through one or more channels in the back iron (housing) radially outboard of the stator core. These cooling methods, however, provide cooling only on the radial and axial periphery of the stator core. Therefore, a hot spot in the stator windings can occur at the axial centerline of the stator core. With physically larger machines the conduction distances from the axial center position of the slots and teeth of the stator core becomes greater, limiting the power level of the machine or requiring lower temperature coolants.

Cooling of wound rotors at low power densities is typically achieved by an oil flow in the rotor shaft and accompanying end turn spray from orifices in the rotor. Cooling of rotors at high power densities is achieved by an oil flow in the rotor shaft and axial flow within the rotor windings.

BRIEF DESCRIPTION OF THE INVENTION

A core for an electric machine includes a core component having a plurality of core teeth defining a plurality of core slots between adjacent core teeth of the plurality of core teeth. The plurality of core slots are receptive of one or more windings. A coolant flowpath through the core component is formed through at least one core tooth. The at least one core tooth has one or more coolant tube banks and one or more mixing chambers arranged in an alternating pattern along the at least one core tooth.

An electric machine includes a rotor located at a central axis of the electric machine. A stator at least partially surrounds the rotor and includes at least one stator winding and a stator core having a plurality of stator core teeth defining a plurality of stator core slots between adjacent stator core teeth of the plurality of stator core teeth. The plurality of stator core slots are receptive of the at least one stator winding. A coolant flowpath through the stator core is formed through at least one stator core tooth of the plurality of stator core teeth. The coolant flowpath has one or more coolant tube banks and one or more mixing chambers arranged in an alternating pattern along the at least one stator core tooth. The coolant flowpath allows for a flow of liquid coolant therethrough to cool the stator.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
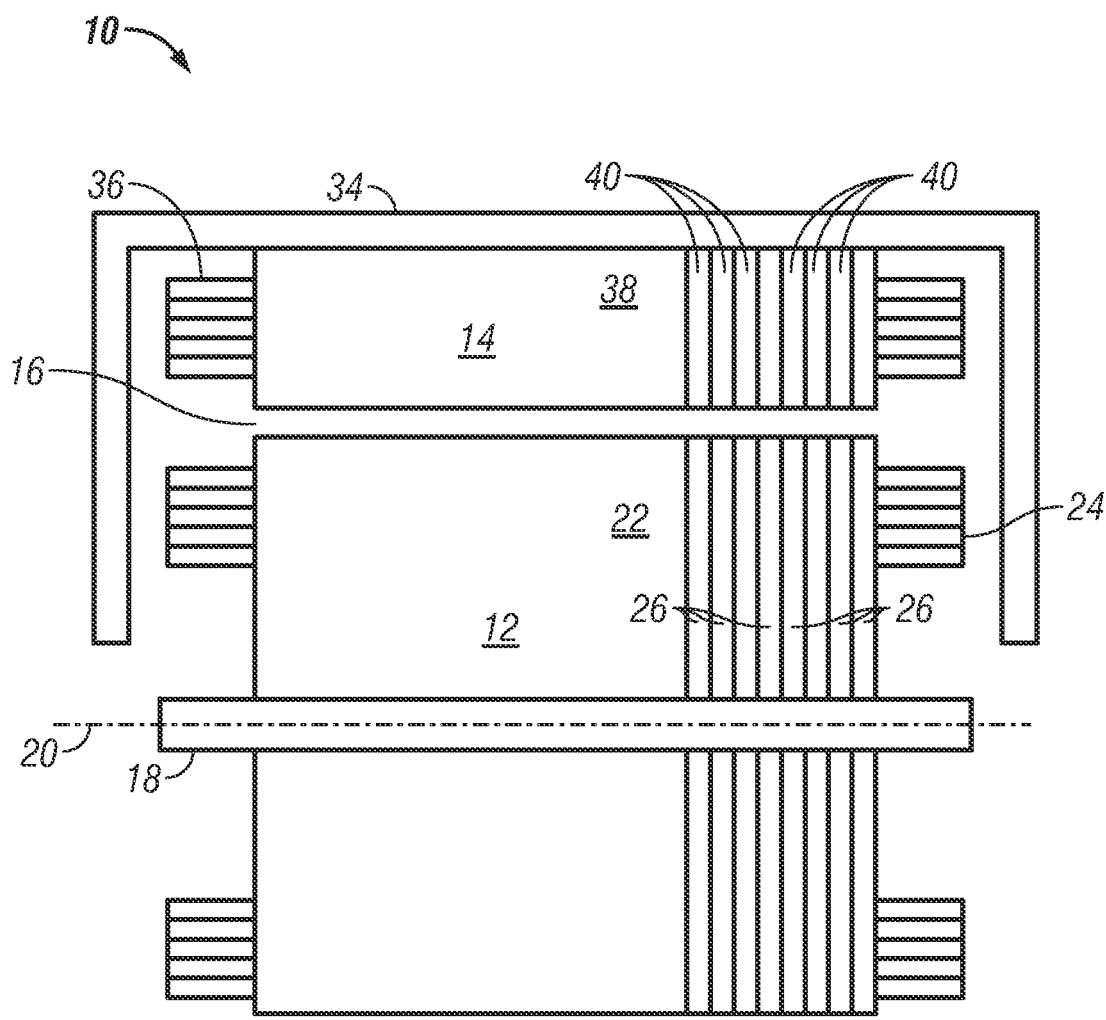
FIG. 1 is a cross-sectional view of an embodiment of an electric machine showing a rotor and a partial view of a stator.
Figure 2:
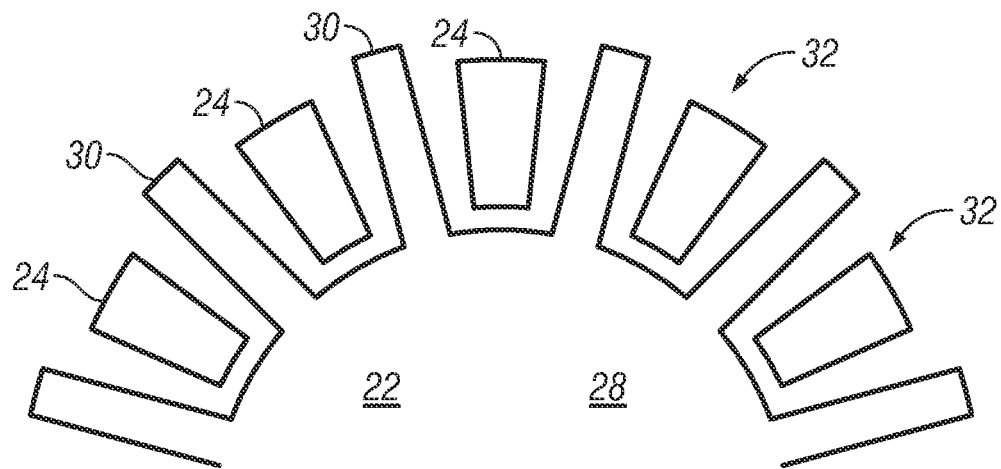
FIG. 2 is an end view of an embodiment of a rotor for an electric machine.

Shown in FIG. 1 is an embodiment of an electric machine 10, for example, a generator. The electric machine 10 includes a rotor 12 and a stator 14 surrounding at least a portion of the rotor 12 such that an air gap 16 exists between the rotor 12 and the stator 14. The rotor 12 is located on a central shaft 18 that rotates about a shaft axis 20 and is secured thereto such that the rotor 12 rotates about the shaft axis 20 with the shaft 18. The rotor 12 includes a magnetic rotor core 22 with one or more rotor windings 24 having a plurality of rotor conductors located at the rotor core 22. The rotor core 22 is formed of a plurality of rotor core laminations 26, which in some embodiments are stacked substantially axially to form the rotor core 22. Referring to FIG. 2, the rotor core 22 includes a rotor core yoke 28 as a core component with a plurality of rotor core teeth 30 extending outwardly from the rotor core yoke 28 and arranged around a circumference thereof. A plurality of rotor core slots 32 are defined by adjacent rotor core teeth 30. The rotor windings 24 at least partially fill the rotor core slots 32.

Figure 3:
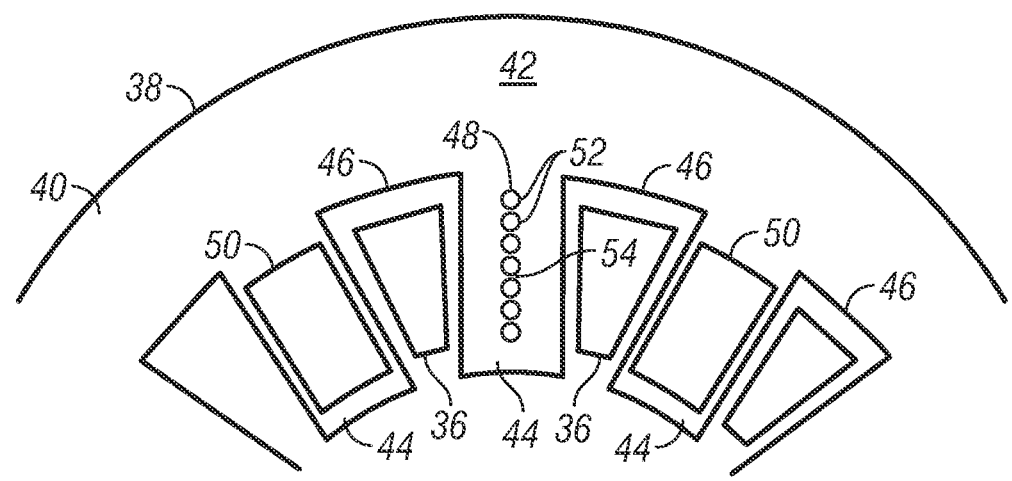
FIG. 3 is an end view of an embodiment of a stator for an electric machine.

Referring again to FIG. 1, the stator 14 is located radially outboard of the rotor 12, and is adjacent to, or secured to a housing 34. The stator 14 includes one or more stator windings 36 having a plurality of stator conductors located at a magnetic stator core 38, which is formed of a plurality of stator core laminations 40, which in some embodiments may be stacked substantially axially. Referring to FIG. 3, the stator core 38 includes a stator core yoke 42 as a core component with a plurality of stator core teeth 44 extending inwardly from the stator core yoke 42 and arranged around a circumference thereof. A plurality of stator core slots 46 are defined by adjacent stator core teeth 44. The stator windings 36 at least partially fill the stator core slots 46.

Referring still to FIG. 3, shown is an embodiment of a cooling scheme for the stator 14. It is to be appreciated that while the description herein is in the context of the stator core 38, it is merely exemplary and for illustrative purposes. The scheme disclosed herein may additionally or alternatively be applied to a rotor core 22. A single exemplary stator core lamination 40 of the stator core 38 is shown in FIG. 3. It shall be understood that the stator core 38 can be formed of a plurality of stator core laminations 40. The stator core teeth 44 are arranged such that a first stator core tooth 44 has a coolant tube bank 48 extending axially therethrough and a second, adjacent stator core tooth 44 has a mixing chamber 50 extending axially therethrough. The arrangement of coolant tube banks 48 and mixing chambers 50 continues in alternating stator core teeth 44 around the stator core 38.

The coolant tube bank 48 includes a plurality of cooling tubes 52, arranged, for example, along a substantially radially extending line 54. It is to be appreciated, however, that this arrangement is merely exemplary, and other arrangements of cooling tubes 52 in the stator core tooth 44 are contemplated in the present disclosure. A quantity of cooling tubes 52 in the coolant tube bank 48 may vary depending on, for example, stator core tooth 44 size and cooling desired. For example, in some embodiments, the coolant tube bank 48 may have between 3 and 15 cooling tubes 52, while in other embodiments, there are 13 cooling tubes 52 in the coolant tube bank 48. Multiple cooling tubes 52 provide redundancy and make the cooling path more tolerant of plugging of one or more cooling tubes 52.

Figure 4:
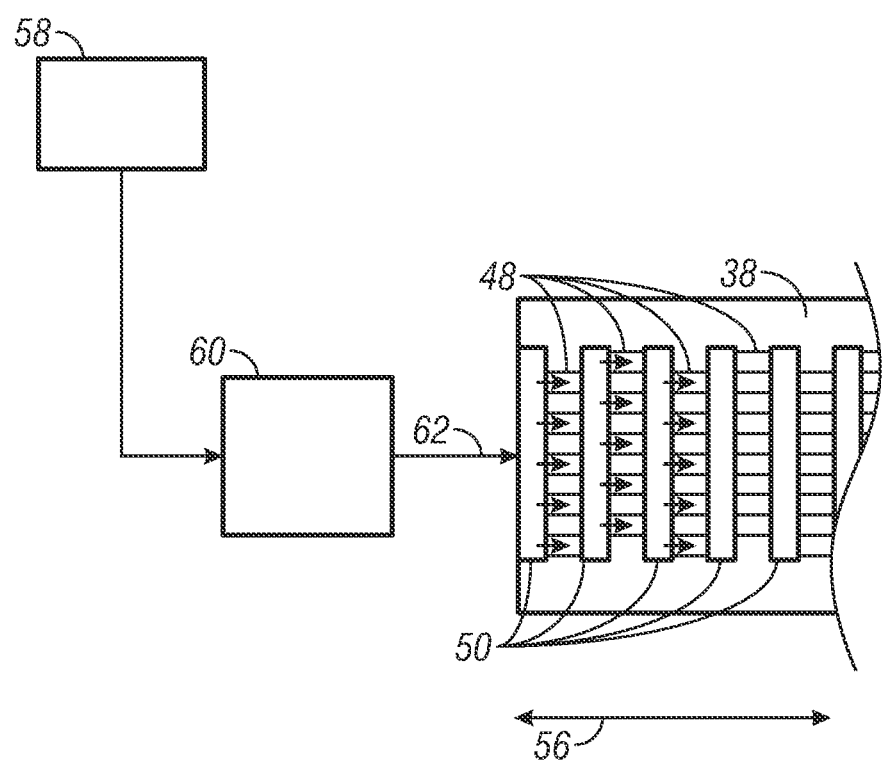
FIG. 4 is a cross-sectional view of an embodiment of a stator for an electric machine.

Referring now to FIG. 4, layers of coolant tube banks 48 and mixing chambers 50 alternate along an axial length 56 of the stator core 38. In typical embodiments, the layers have a thickness that is greater than the thickness of one stator core lamination 40. For example, the stacked layers can be between 3 and 8 times the thickness of one stator core lamination 40, therefore including 3 to 8 stator core laminations 40, which in some embodiments are substantially identical, in an axial stack The axially alternating sequence of tube banks 48 and mixing chambers 50 is formed during assembly of the stator core 38 by rotating successive multi-lamination layers by one stator core tooth 44. The stacking arrangement determines heat transfer and pressure drop characteristics of the rotor 14 cooling scheme. During operation of the electric machine 10, a flow of coolant 62, for example, an oil or other liquid, is urged to the stator core 38 from a coolant source 58. A manifold 60 may be located between the coolant source 58 and the stator core 38 to distribute the coolant 62 to the plurality of stator core teeth 44. In some embodiments, the manifold 60 is typically situated at an axial centerline of the stator core 58. The coolant 62 flows axially through the stator core tooth 44 alternatively through the axially staggered coolant tube banks 48 and mixing chambers 50. Further, as shown, the cooling tubes 52 in successive coolant tube banks 48 may be offset or staggered, for example, radially, to promote liquid mixing and disruption in the boundary layer, by defining a trip in the flow, which improves heat transfer between the stator core 38 and the coolant 62. A single lamination may consist of both mixing chambers 50 in some zones and cooling tubes 52. The clocking scheme will provide the alternation of those patterns in a given zone.

The cooling scheme described herein may be used in combination with other cooling schemes, for example, end-turn spray cooling and back-iron cooling. The axial profile of temperature in the stator winding 36 is flattened, reducing the hot spot at the center axial area of the stator core 38 and average temperature is lowered compared to conventional cooling. The network of passages including the plurality coolant tube banks 48 and plurality of mixing chambers 50 provides both a high wetted surface area and excellent heat transfer coefficients due to their small size. The temperature rise is limited as it is inversely proportional to the area and the heat transfer coefficient. Also, performance of the cooling system, namely the trade between heat transfer and pressure drop, can be adjusted without changing the lamination design by simply changing the pattern of stacking the stator core laminations 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A core for an electric machine comprising:
a core component having a plurality of core teeth defining a plurality of core slots between adjacent core teeth of the plurality of core teeth, the plurality of core slots receptive of one or more windings; and
a coolant flowpath through the core component formed through at least one core tooth, the at least one core tooth having three or more coolant tube banks and two or more mixing chambers arranged in an alternating pattern along an axial length of the at least one core tooth, a first mixing chamber receiving a coolant flow from two or more coolant tubes of a first coolant tube bank at a first axial end of the first mixing chamber and dispensing the coolant flow to two or more coolant tubes of a second coolant tube bank at a second axial end of the first mixing chamber, all coolant tubes of the first coolant tube bank being radially offset from all coolant tubes of the second coolant tube bank, a second mixing chamber receiving the coolant flow from the second coolant tube bank and dispensing the coolant flow to two or more coolant tubes of a third coolant tube bank, all coolant tubes of the third coolant tube bank radially aligned with corresponding coolant tubes of the first coolant tube bank, the first coolant tube bank and the second coolant tube bank having equal numbers of coolant tubes.

2. The core of claim 1, wherein each coolant tube bank comprises between 3 and 15 coolant tubes.

3. The core of claim 1, wherein the core component is formed from a plurality of core laminations arranged in a substantially axial stack.

4. The core of claim 3, wherein each coolant tube bank and each mixing chamber is a single core lamination thick.

5. The core of claim 3, wherein at a given axial location along the core, a first core tooth of the plurality of core teeth of each lamination includes a coolant tube bank, and a circumferentially adjacent second core tooth of the same lamination includes a mixing chamber at the same axial location.

6. The core of claim 5, wherein remaining core teeth of the plurality of core teeth alternatingly include a coolant tube bank or a mixing chamber.

7. The core of claim 1, wherein the core is a stator core.

8. The core of claim 1, wherein the core is a rotor core.

9. An electric machine comprising:
a rotor disposed at a central axis of the electric machine;
a stator at least partially surrounding the rotor; the stator including:
at least one stator winding;

a stator core having a plurality of stator core teeth defining a plurality of stator core slots between adjacent stator teeth of the plurality of stator core teeth, the plurality of stator core slots receptive of the at least one stator winding; and a coolant flowpath through the stator core formed through at least one stator core tooth of the plurality of stator core teeth having three or more coolant tube banks and two or more mixing chambers arranged in an alternating pattern along an axial length of the at least one stator core tooth, a first mixing chamber receiving a liquid coolant flow from two or more coolant tubes of a first coolant tube bank at a first axial end of the first mixing chamber and dispensing the coolant flow to two or more coolant tubes of a second coolant tube bank at a second axial end of the first mixing chamber, all coolant tubes of the first coolant tube bank being radially offset from all coolant tubes of the second coolant tube bank, a second mixing chamber receiving the coolant flow from the second coolant tube bank and dispensing the coolant flow to two or more coolant tubes of a third coolant tube bank, all coolant tubes of the third coolant tube bank radially aligned with corresponding coolant tubes of the first coolant tube bank, the first coolant tube bank and the second coolant tube bank having equal numbers of coolant tubes;

wherein the flow of liquid coolant therethrough cools the stator.

10. The electric machine of claim 9, wherein each coolant tube bank comprises between 3 and 15 coolant tubes.

11. The electric machine of claim 9, wherein the stator core is formed from a plurality of stator core laminations arranged in a substantially axial stack.

12. The electric machine of claim 11, wherein each coolant tube bank and each mixing chamber is one stator core lamination thick.

13. The electric machine of claim 11, wherein at a given axial location along the core a first stator core tooth of the plurality of stator core teeth of each stator core lamination includes a coolant tube bank, and a circumferentially adjacent second stator core tooth includes a mixing chamber at the same axial location.

14. The electric machine of claim 13 wherein remaining stator core teeth of the plurality of stator core teeth alternatingly include a coolant tube bank or a mixing chamber.

* * * * *